July 21, 1936. J. E. LINABURY 2,048,190
MOLDING MACHINE
Filed Feb. 18, 1935 6 Sheets-Sheet 3

INVENTOR
John E. Linabury
BY Liverance & Van Antwerp
ATTORNEY

July 21, 1936.  J. E. LINABURY  2,048,190
MOLDING MACHINE
Filed Feb. 18, 1935  6 Sheets—Sheet 5

INVENTOR
John E. Linabury
BY Liverance & Van Antwerp
ATTORNEY

July 21, 1936.  J. E. LINABURY  2,048,190
MOLDING MACHINE
Filed Feb. 18, 1935  6 Sheets-Sheet 6
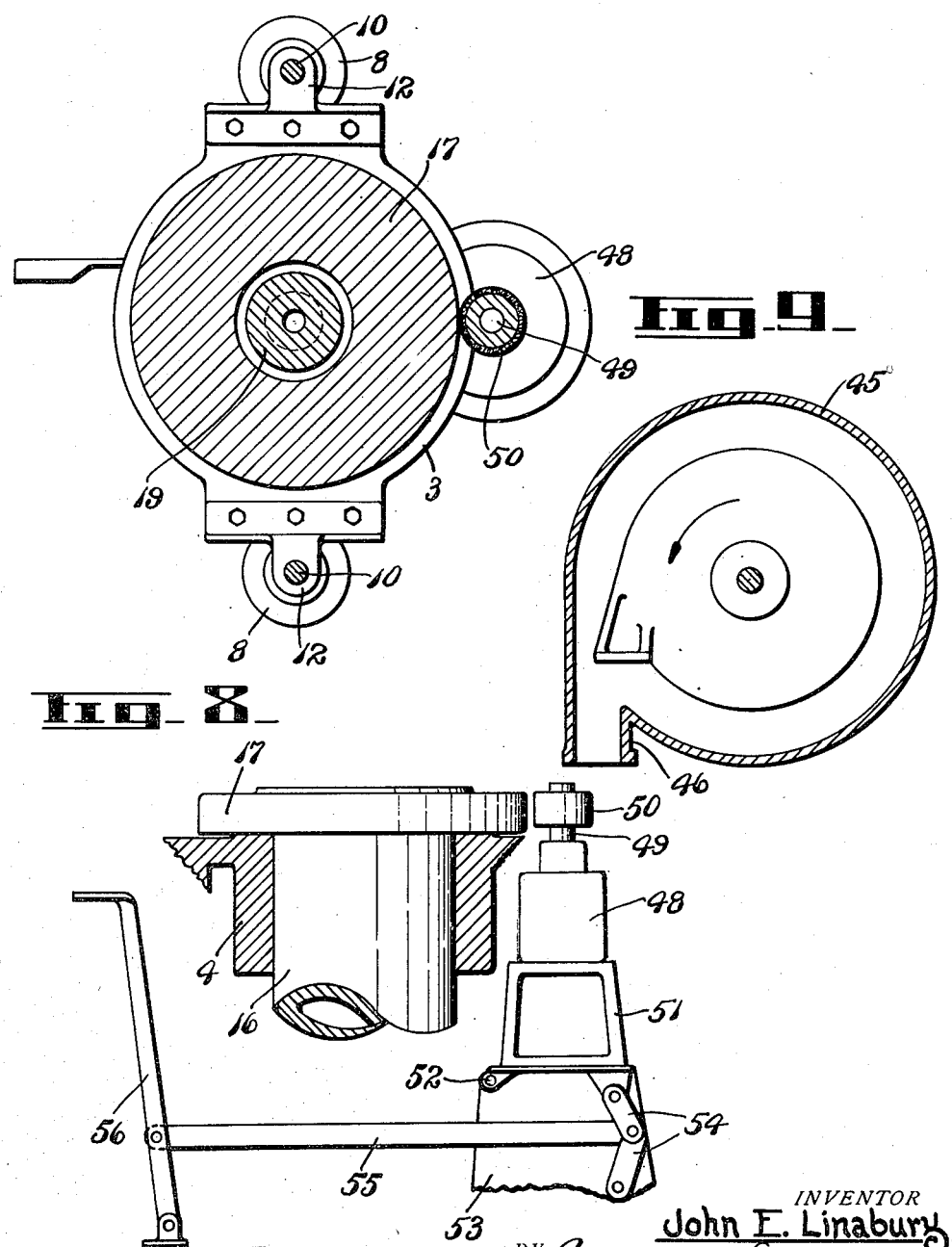
INVENTOR
John E. Linabury
BY Liverance & Van Antwerp
ATTORNEYS Patented July 21, 1936

2,048,190

UNITED STATES PATENT OFFICE 2,048,190

MOLDING MACHINE

John E. Linabury, Muskegon, Mich., assignor to Campbell, Wyant & Cannon Foundry Company, Muskegon Heights, Mich., a corporation of Michigan Application February 18, 1935, Serial No. 7,148

8 Claims. (Cl. 22—21)

This invention relates to molding machines. More particularly it is concerned with a machine for preparing molds for the casting of cylinder sleeves and liners such as are used in the cylinders of engines, pumps, air compressors and the like. Such sleeves or liners are centrifugally cast. The mold which is required is of a cylindrical shape and of a suitable length and diameter that the molten metal may be deposited at the inner side of the mold, which is rotated about its longitudinal axis, whereby the metal, through centrifugal force, spreads evenly over the inner sides of the mold and is of a substantially uniform thickness resulting in the production of a sleeve of cast iron.

The objects of the present invention are to produce a molding machine wherein molds for use in the production of centrifugally cast cylinder sleeves, bearing bushings and the like may be rapidly and economically made without undue waste of molding sand and other materials. By this invention also the molds may be produced using low grades of molding sand thereby enhancing the economy of production of the centrifugally cast iron sleeves and the like. Many other objects and purposes and many novel constructions and arrangements of parts for effectively attaining the above ends will be understood from the following description, taken in connection with the accompanying drawings, in which, Fig. 1 is a central vertical section through the machine, with parts thereof shown in elevation, taken substantially on the line I—I of Fig. 5.

Fig. 7 is a horizontal section on the plane of line 7—7 of Fig. 1.

Fig. 8 is a fragmentary elevation, with parts in section and broken away, illustrating the mechanism used for rotating the flask and its supports during the operation of filling the mold with sand, and Fig. 9 is a vertical sectional view of the sand throwing mechanism.

Like reference characters refer to like parts in the different figures of the drawings.

In the construction of the machine a horizontal supporting base 1 is provided, upon which a supporting cylinder of relatively thin metal 2 is secured, upon the upper end of which a horizontal plate 3 rests. This plate at its central portion has a cylindrical opening therethrough which is surrounded by a downwardly extending guide sleeve 4.

Figure 1:
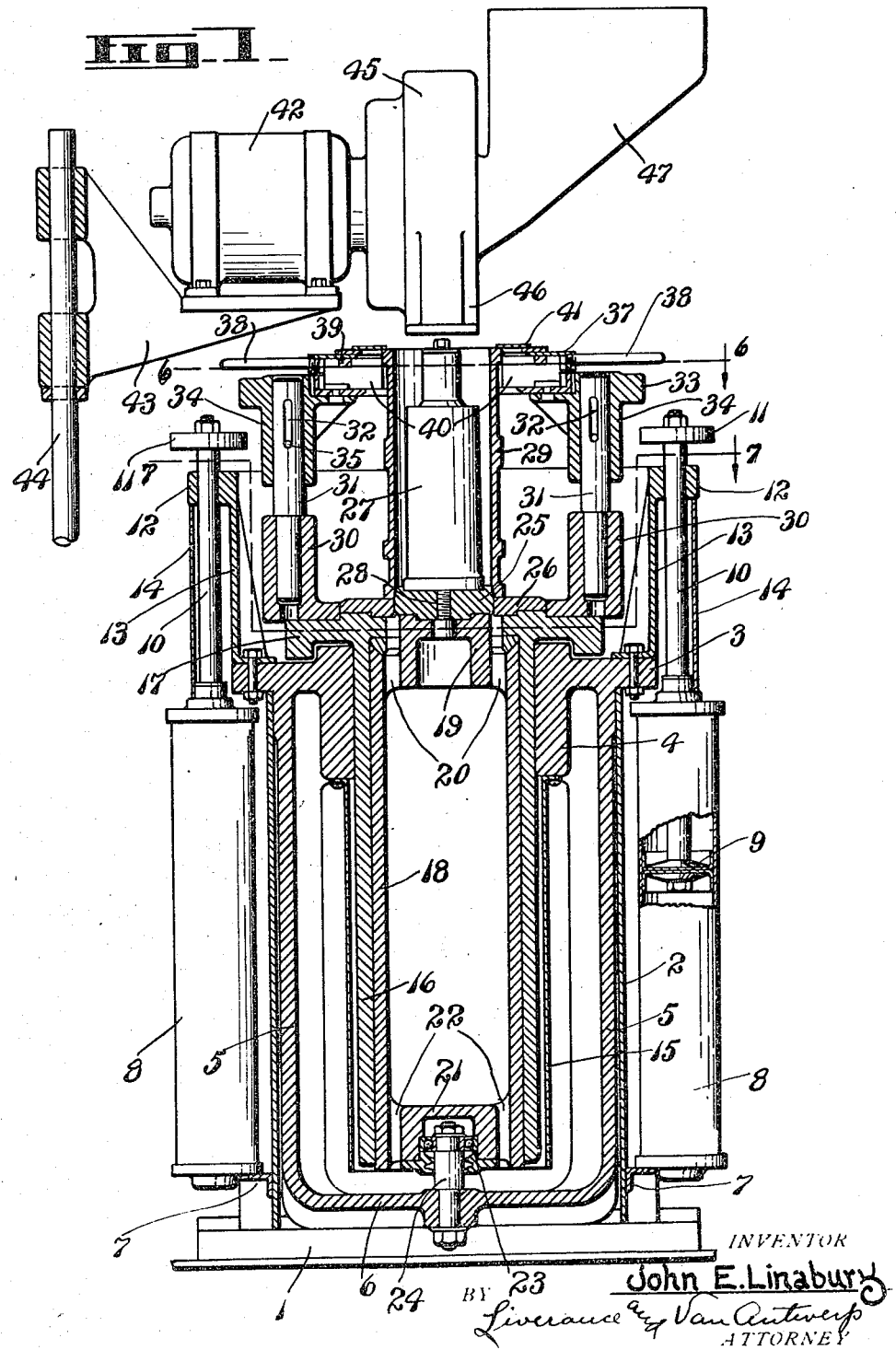
Figure 3:
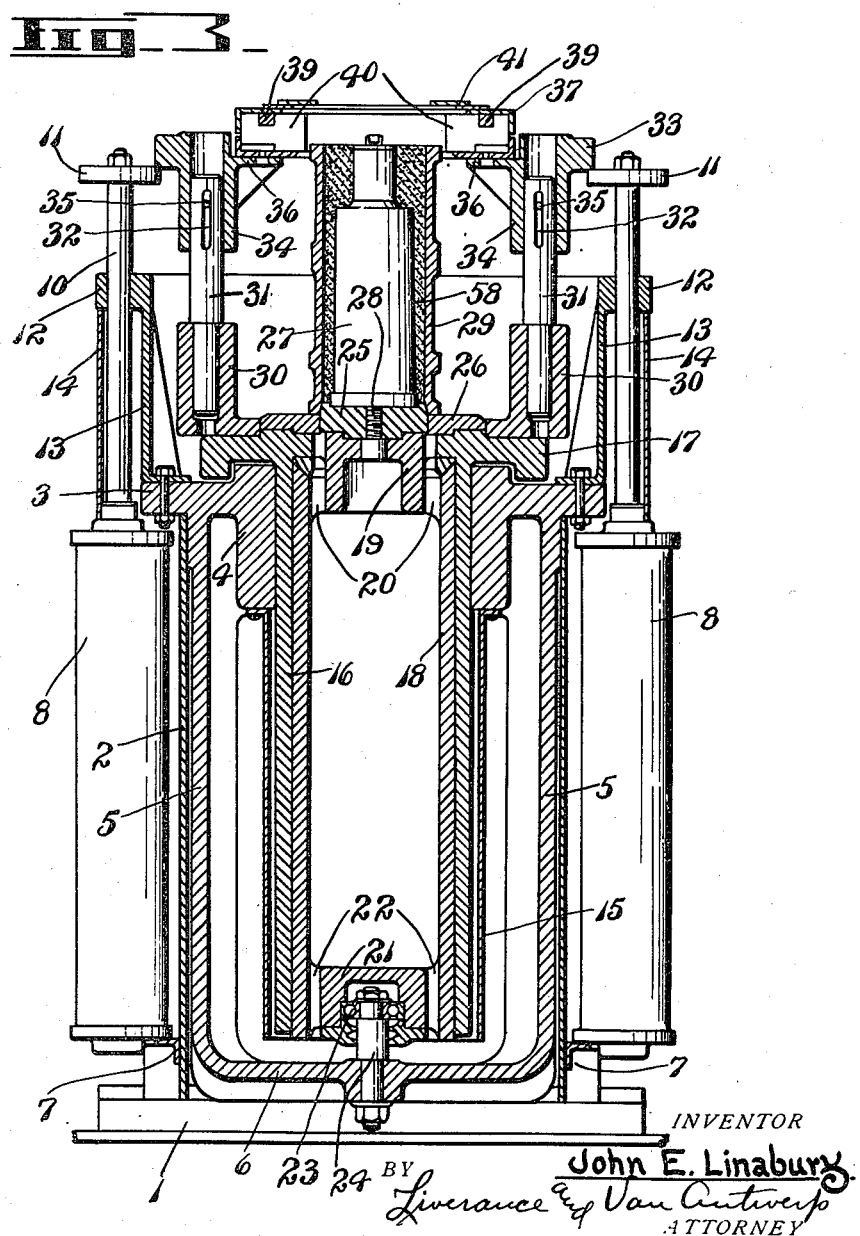
Fig. 3 is a section similar to that shown in Fig. 1, with the chuck for gripping the upper end of the flask elevated and in the position which it occupies when the mold is to be removed and a new flask placed in the machine.
Figure 4:
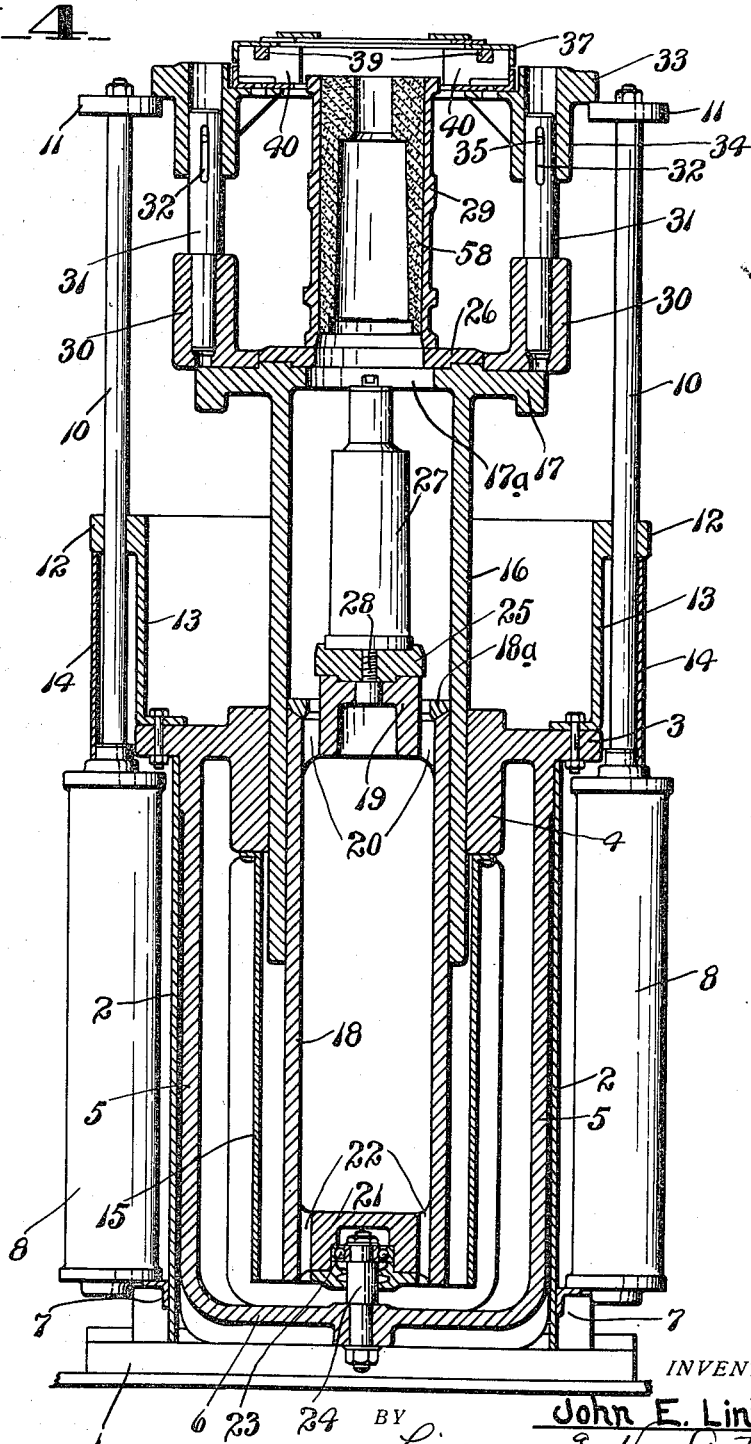
Fig. 4 is a like vertical sectional view showing the position of the parts after the operation of separating the mold and pattern has been performed.
Figure 5:
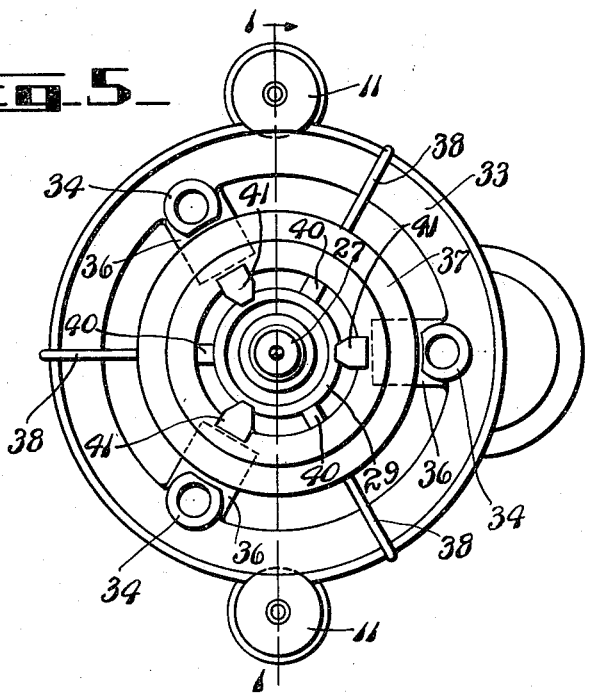
Fig. 5 is a plan view of the machine.

Immediately within the cylinder 2 is a U-shaped frame having vertical legs 5 connected by a horizontal lower cross member 6. The plate 3, sleeve 4 and the U-shaped frame are integrally cast and are supported by the insertion of the U-shaped frame into the upper end of the cylinder 2 and with the outer portions of the plate 3 resting upon the upper end of the cylinder 2, as shown in Figs. 1, 3, and 4.

Brackets 7 are located at substantially diametrically opposed sides of the cylinder 2 and adjacent its lower end, bearing also upon the base 1 and serve to carry vertical air cylinders 8 two of which are shown at opposite sides of the machine. These cylinders extend nearly to the plate 3. Pistons 9 are in the cylinders from which piston rods 10 extend through the upper ends of the cylinders. At the upper end of each piston rod a horizontal disk 11 is secured. The upper portions of the piston rods 10 pass through guide ears or bosses 12 which are cast integral with a cylindrical apron 13 which is mounted upon and extends above the plate 3. Protective enclosing plates 14 between the bearing lugs or bosses 12 and the upper ends of the cylinders are used to prevent molding sand getting into the cylinders or between the piston rods and the heads at the upper ends of the cylinders. Likewise a cylinder 15 of sheet metal is permanently secured to and extends downwardly from the lower end of the bearing sleeve 4 previously described to protect the parts within this sleeve from sand.

A hollow elongated cylindrical member 16 passes through the sleeve 4 and is free for vertical movement therethrough, in which movement, it is guided by the said sleeve 4. At the upper end of the member 16 a horizontal table 17 is cast which extends over the plate 3 previously described. Within the member 16 an elongated cylinder 18 is mounted in the upper end of which an integral plug 19 is cast, there being openings 20 between the sides of the plug 19 and the inner sides of the cylinder 18. The lower end of the cylinder 18 also has a closure plug 21 with vertical openings 22 at the sides thereof between it and the cylinder 18 whereby any sand which passes to the interior of the cylinder 18 may pass through the openings 22. The lower plug or closure 21 serves as a bearing housing for an anti-friction ball bearing 23 located around a bearing stud 24 which is secured to and extends upwardly from the lower cross member 6 of the U-shaped support previously described. This permits a rotation of the cylinder 18 about its longitudinal vertical axis. Between the upper end of the cylinder 18 and the lower side of the table 17 a ring 18a is located of the form shown best in Fig. 4.

A member 25 to serve as a seat for the pattern and also properly locate the lower end of the flask is centrally positioned at the upper side of the plug 19, surrounding which is a plate 26 which is carried by the table 17. The pattern 27 is fixed to the member 25 and plug 19 by means of a screw threaded rod 28 which passes therethrough and has a nut at its upper end, thereby positioning the substantially cylindrical pattern 27 vertically and with its axis coincident with the vertical axis of the cylinder 18 and of the cylindrical member 16. A flask 29 of cylindrical form is located around the pattern and with its lower end extending a short distance over the tapered upper end of the seat 25 as shown and resting upon the plate 26. This centers the lower end of the flask with respect to the pattern.

At spaced apart points around the table 17 brackets 30 are secured from each of which a post 31 extends upwardly, the upper end portion of which is longitudinally slotted for a distance as indicated at 32. A ring 33 is formed with a plurality of sleeves 34 to telescope over the upper ends of the posts 33. Each sleeve has a transverse pin 35 passing through the slot 32 of its respective post 31. There are three of the posts and three of the sleeves equally spaced from each other around the ring 33 as shown.

Figure 2:
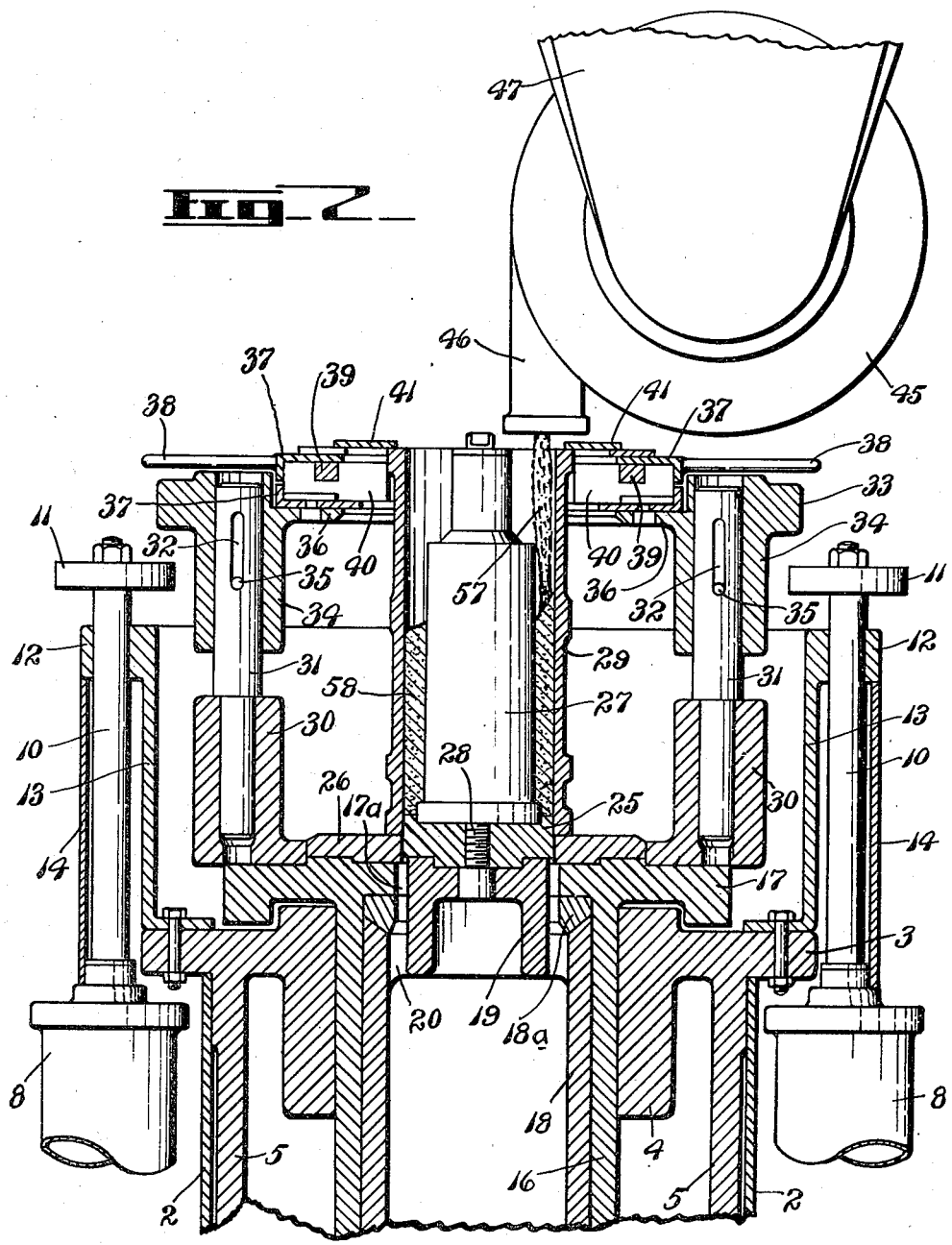
Fig. 2 is a somewhat enlarged fragmentary section, similar to that shown in Fig. 1, of the upper part of the molding machine, showing the mold partly filled with the molding sand.
Figure 6:
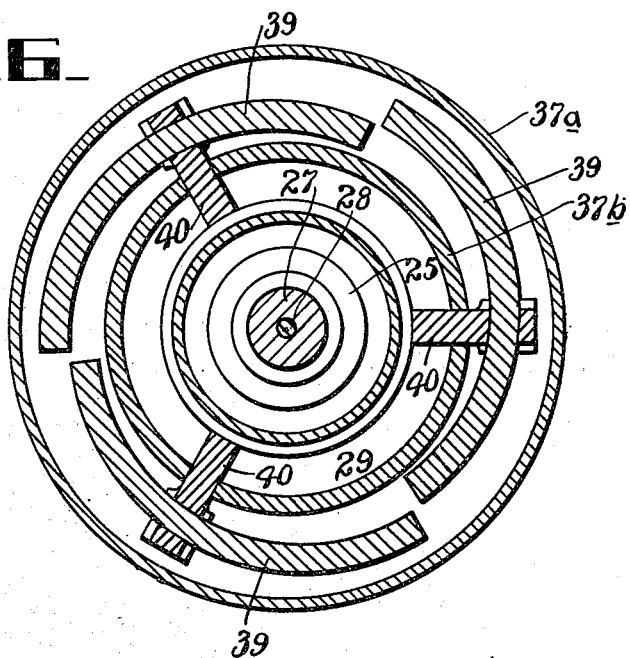
Fig. 6 is a horizontal section on the plane of line 6—6 of Fig. 1.

Supporting brackets 36 extend inwardly from the ring 33 adjacent each of the posts on which a chuck is carried consisting of upper and lower members 37 which are of a ring-shaped form. The upper member is turnable by means of handles 38 (Fig. 6) which are attached to the outer vertical side 37a of the upper ring. Eccentric segments 39, three in number as shown in Fig. 6, are connected with and move upon turning movement of the upper chuck member 37. Chuck jaws 40 pass radially through inner walls 37b of the chuck and are actuated by the segments 39 to move radially inward or outward, depending upon the direction of turning movement given. Such jaws, when they are moved inwardly, engage against the upper end portion of the flask 29 and hold it securely in proper central position. A flat ring with clips 41 thereon is mounted around the upper central opening of the chuck, the clips projecting slightly over the upper end of the flask 29 and bearing thereagainst, as shown in Figs. 1 and 2, when the parts are in a position to receive sand within the flask.

Molding sand is projected into the flask and against the pattern by a rotary sand thrower. An electric motor 42 is carried on a bracket 43 mounted upon a vertical supporting post 44 positioned to one side of the machine. The shaft of the motor is connected with a sand thrower within a housing 45 which has an outlet 46 and a hopper 47 into which sand may be placed to go to the sand throwing mechanism. This entire mechanism may be swung about the post 44 so that the outlet 46 can be brought into position directly above the upper end of the flask 29 (Fig. 2) for throwing the molding sand into the flask and making the mold around the pattern.

The table 17 is adapted to be rotated by a friction drive thereof. For this purpose an electric motor 48 (Fig. 8), located vertically and having the upper end of its shaft 49 equipped with a friction pulley 50, is mounted on a support 51, which in turn is pivotally connected at one side, at 52, to a fixed support 53. Toggle links 54 are connected together at adjacent ends. One of the links is pivoted to the support 51 at the side opposite the shaft 52, and the other link is pivoted to the support 53. A rod 55 connects with the toggle links at its knee or knuckle at one end, while at its opposite end it is pivotally connected to a hand lever 56 between the ends thereof. The hand lever is pivotally connected at its lower end to a suitable fixture. By moving the hand lever in Fig. 8 to the left, the friction pulley 50 is brought into driving engagement with the circumferential surface of the table 17.

Operation

Assuming the flask and pattern to be in position for receiving the molding sand, as shown in Fig. 1, motor 48 is started and the friction pulley 50 brought against the table 17. This rotates the table and the attached cylindrical member 16 and also all of the parts which are located above the table. In addition the cylinder 18 may turn with the member 16 within which it is positioned. The sand thrower is swung to a position, such as shown in Figs. 1 and 2. Its motor 42 operates the sand thrower within the housing 45 and sand is thrown as shown at 57, in a stream into the flask 29, which as it is continually changing position, results in the cylindrical space between the pattern and the flask being supplied with sand until the entire flask is filled. The sandthrower throws the sand with the requisite degree of force and in such controlled amounts that the resulting mold 58 is compacted by the impact of the sand to the necessary density.

When the flask has been filled with sand and the supply of sand in the hopper 47 is exhausted, the sand thrower is swung out of the way to permit drawing the mold from the pattern. The first thing to be done after the space surrounding the pattern in the flask has been filled with sand, is to operate the handles 38 which release the chuck from engagement with the flask. The next step is to admit compressed air into the lower ends of the cylinders 8, whereupon pistons 9, piston rods 10 and the disks 11 are elevated. The disks 11 engage under the ring 33 and lift it and the chuck which it carries, first to the position shown in Fig. 3 or slightly above, or until the pins 35 engage the upper ends of the slots 32 in the rod 31. This elevates the chuck which has engaged the upper end of the flask 29 to a position substantially above the upper end of the said flask. Continued upward movement of the piston rods 10 lifts the table 17 and all the parts connected therewith and supported thereby, together with the flask and mold 58 therein, withdrawing the mold from the pattern 27, and the parts take the position shown in Fig. 4. In this position the flask with the mold therein may be removed and a succeeding empty flask put in place. Then by exhausting the compressed air in the cylinders 8 from below the pistons 9, the parts by reason of their weight, will be returned by gravity to the position shown in Fig. 1 and the flask centered at its lower end on the member 25. The chuck 38 may then be closed to securely hold and properly locate the upper end of the flask; when the process of filling the flask with molding sand may be repeated.

With a machine operating as thus described, very rapid and economical production of molds of the desired character may be had. The mold may be made of the usual green molding sand, and as soon as removed from the machine are ready for casting into. The machine has proved very useful and practical in service, especially for producing cylindrical molds.

The invention is defined in the appended claims and is to be considered comprehensive of all forms of structure coming within their scope.

I claim:

1. In a molding machine, a table having a central opening, a pattern support extending upwardly through said opening, means for mounting both the table and the pattern support for rotation, a pattern supported at its lower end by and extending upwardly from the pattern support, a cylindrical flask located around the pattern and supported on said table to rotate therewith, means for rotating the table, flask, pattern and pattern support, means for projecting a stream of sand into the upper end of the flask while it is rotating until the space in the flask adjacent the pattern is filled, means for separating the pattern and the mold in the flask therearound from each other and means for releasing the supporting means whereby the flask may be moved laterally along the surface of the table.

2. A molding machine comprising among other of its elements, a supporting frame, a horizontally disposed table mounted for rotation about a vertical axis, a pattern supported at the axis of the table, a flask surrounding the pattern, and resting upon the table, holding means mounted upon the table and engaging the upper portion of the flask, movable means for rotatively delivering sand into the flask against the pattern, means for elevating the said flask holding means to a position above the flask and thereafter withdrawing the flask upwardly from the pattern.

3. In a device of the character described, a table, means for revolubly mounting said table, a flask located above said table, a ring located about the upper end of the flask, clutch means mounted upon said ring adapted to grip the said flask and lost motion means for mounting the ring whereby the said clutch means may be elevated above the said flask to permit lateral removal of the same.

4. In combination, a base, a U-shaped frame having upwardly extending arms which terminate in a circular guide sleeve, a cylindrical member movably and revolubly mounted within said guide sleeve, a table located at the top of said cylindrical member, a flask supported above said table, a clutch engaging the said flask in spaced relation to the table, and lost motion means between the table and the clutch for the purpose described.

5. The combination comprising, a supporting base, a frame having upwardly extending sides terminating in a guide bearing, a cylindrical member movably mounted in said guide bearing, a table located above the said cylindrical member, a flask supported above said table, a clutch engaging the said flask in spaced relation to the table and an elevating means for first raising the clutch and then raising the flask.

6. The combination of a molding machine comprising, a supporting base, a frame having upwardly extending sides terminating at the top in a guide bearing, a bearing mounted at the bottom of the frame, a cylindrical member movably mounted in said guide bearing, a table located above the said cylindrical member, a pattern supported above the said table, a flask surrounding the said pattern above the table, means for rotating the table, a clutch engaging the said flask in spaced relation to the table and an elevating means whereby the clutch is raised above the flask and thereafter the flask is withdrawn from the pattern.

7. A molding machine comprising, a table, means for holding a cylindrical flask in vertical position on said table, a vertical pattern supported within the flask, means for rotating the table, pattern and flask, means for throwing molding sand into the upper end of the flask, while the same and the pattern are rotating, means for elevating the table and flask to withdraw the mold from the pattern, means for gripping and automatically holding the upper end of the flask in proper relative position with respect to the pattern, and means for elevating said gripping means, when out of gripping position with the flask, a distance sufficient to lift the same above the upper end of the flask prior to elevating the table and flask.

8. A molding machine comprising, a table having a flat surface, means for holding a cylindrical flask in vertical position on said table with its lower end upon said flat surface, a vertical pattern supported within the flask, means for rotating the table, pattern and flask, means for throwing molding sand into the upper end of the flask while the same and the pattern are rotating and means for elevating the table and flask whereby the flask may be withdrawn horizontally upon release of the said holding means.

JOHN E. LINABURY.